US009393886B2

(12) United States Patent
Berger

(10) Patent No.: US 9,393,886 B2
(45) Date of Patent: Jul. 19, 2016

(54) SAFETY SEAT/BOOSTER SEAT HARNESS PAD

(71) Applicant: DIONO, LLC, Puyallup, WA (US)

(72) Inventor: Russell Berger, Needham, MA (US)

(73) Assignee: Diono, LLC, Sumner, WA (US)

( * ) Notice: Subject to any disclaimer, the term of this patent is extended or adjusted under 35 U.S.C. 154(b) by 0 days.

(21) Appl. No.: 14/477,584

(22) Filed: Sep. 4, 2014

(65) Prior Publication Data
US 2015/0246626 A1 Sep. 3, 2015

Related U.S. Application Data

(60) Provisional application No. 61/946,523, filed on Feb. 28, 2014, provisional application No. 62/010,364, filed on Jun. 10, 2014.

(51) Int. Cl.
B60N 2/28 (2006.01)
(52) U.S. Cl.
CPC ....... B60N 2/2812 (2013.01); B60N 2002/2815 (2013.01); Y10T 29/49716 (2015.01)
(58) Field of Classification Search
CPC ............... B60N 2/2839; B60N 2/2866; Y10T 29/49716
See application file for complete search history.

(56) References Cited

U.S. PATENT DOCUMENTS

| 3,397,913 A | 8/1968 | Fein |
| 5,294,183 A | 3/1994 | Wetter et al. |
| 5,312,159 A | 5/1994 | Essa et al. |
| 5,584,536 A | 12/1996 | White |
| 5,839,793 A | 11/1998 | Merrick et al. |
| 6,457,774 B2 | 10/2002 | Baloga |
| 6,471,298 B2 | 10/2002 | Carine et al. |
| 6,557,895 B2 | 5/2003 | Haack et al. |
| 6,893,088 B2 | 5/2005 | Kassai et al. |
| 7,350,862 B2 | 4/2008 | Fransen et al. |
| 7,506,929 B2 | 3/2009 | Fransen et al. |
| 7,552,969 B2 * | 6/2009 | Maciejczyk ......... B60N 2/2809 280/801.1 |

(Continued)

FOREIGN PATENT DOCUMENTS

| EP | 1454805 | 2/2004 |
| WO | WO2009003197 | 3/2009 |
| WO | WO2013170088 | 11/2013 |

OTHER PUBLICATIONS

International Search Report and Written Opinion for PCT/US2015/014882. Mailed May 14, 2015.

Primary Examiner — Rodney Mintz
(74) Attorney, Agent, or Firm — Stetina Brunda Garred & Brucker

(57) ABSTRACT

A harness pad which is adapted for retrofit attachment to or inclusion as an original component of a safety seat and to interface with prescribed portions of the harness system thereof, the harness pad being uniquely configured to extend over or span the top of the shoulder of a child secured within the safety seat to significantly impede any potential forward excursion of the child. In another embodiment, the harness pad is adapted for retrofit attachment to or inclusion as an original component of a booster seat and interface to a portion of the existing vehicle seat belt or restraining system used to maintain a child therein, such harness pad likewise being uniquely configured to extend over or span the top of the shoulder of a child secured within the booster seat to significantly impede any potential forward excursion of the child.

20 Claims, 10 Drawing Sheets

(56) References Cited

U.S. PATENT DOCUMENTS

| | | |
|---|---|---|
| 7,644,986 B2 * | 1/2010 | Berger et al. ............ 297/216.11 |
| 8,211,043 B2 * | 7/2012 | Horvath .................. A61F 5/028 |
| | | 119/856 |
| 8,226,588 B2 * | 7/2012 | Horvath .................. A61F 5/028 |
| | | 119/856 |
| 8,240,772 B2 | 8/2012 | Kawata et al. |
| 8,408,656 B2 | 4/2013 | Carpenter |
| 8,534,756 B2 | 9/2013 | Zhao |
| 8,550,567 B2 | 10/2013 | Biaud |
| 2003/0159258 A1 | 8/2003 | Wetter |
| 2007/0063498 A1 | 3/2007 | Hollander |
| 2007/0210639 A1 * | 9/2007 | Berger et al. .................. 297/470 |
| 2008/0265653 A1 | 10/2008 | Wetter |
| 2009/0320189 A1 * | 12/2009 | Raghuprasad ......... A41D 13/02 |
| | | 2/456 |
| 2010/0052402 A1 * | 3/2010 | Berger et al. .................. 297/471 |
| 2011/0006572 A1 | 1/2011 | Zhao |
| 2011/0270143 A1 * | 11/2011 | Horvath .................. A61F 5/028 |
| | | 602/19 |
| 2011/0270144 A1 * | 11/2011 | Horvath .................. A61F 5/028 |
| | | 602/19 |
| 2012/0205960 A1 | 8/2012 | Finch |
| 2012/0274120 A1 | 11/2012 | Smith et al. |
| 2015/0008711 A1 * | 1/2015 | Daley .................. B60N 2/5816 |
| | | 297/219.12 |

\* cited by examiner

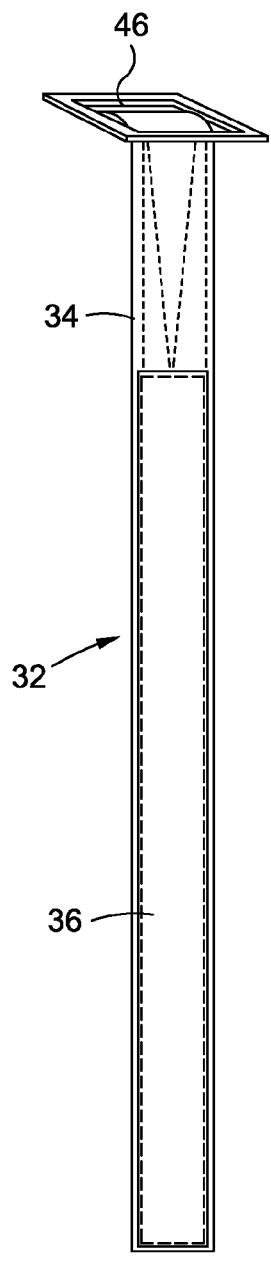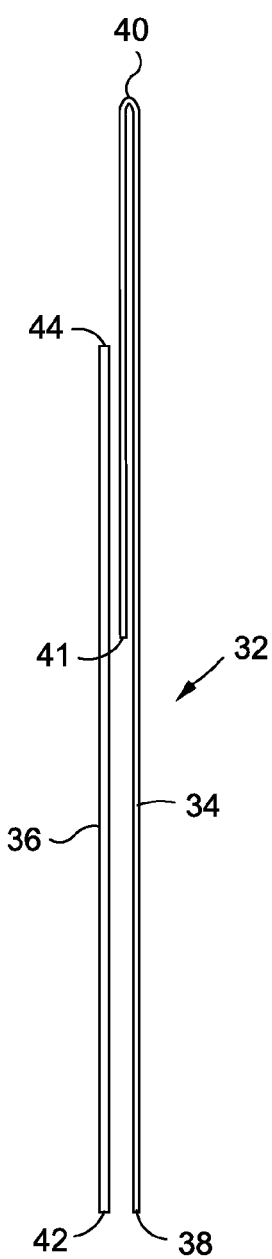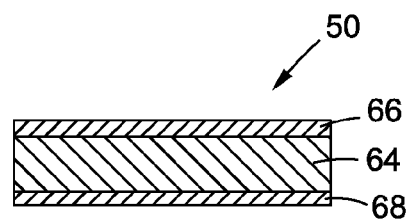
FIG. 4  FIG. 5  FIG. 6

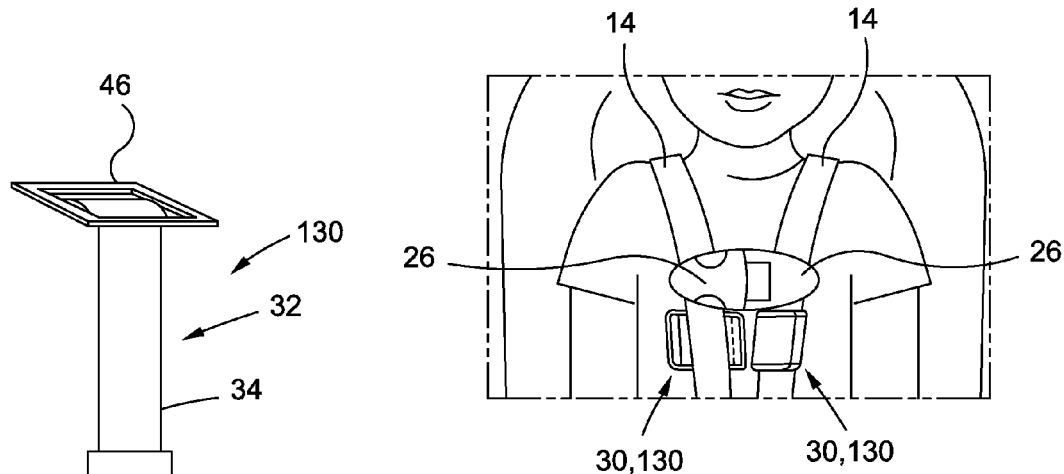
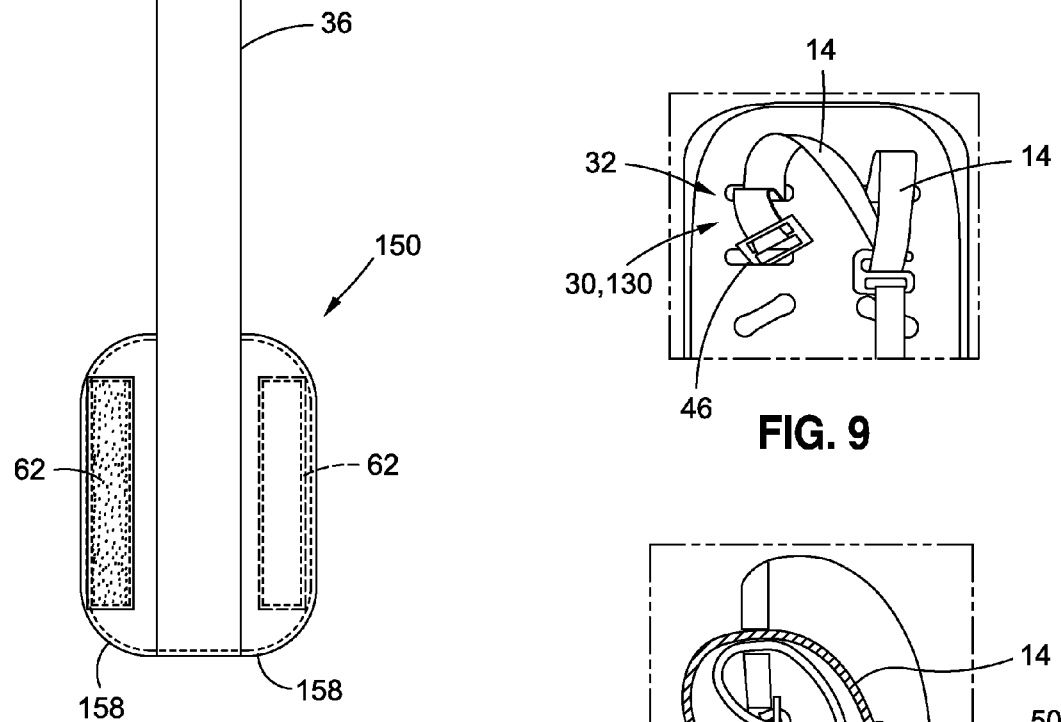
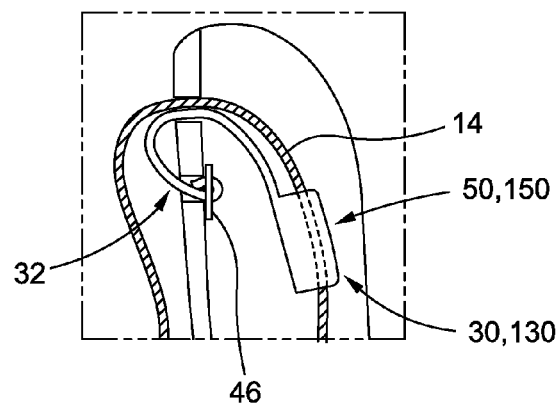

SAFETY SEAT/BOOSTER SEAT HARNESS PAD

CROSS-REFERENCE TO RELATED APPLICATIONS

This application claims priority to U.S. Provisional Patent Application Ser. No. 61/946,523 filed Feb. 28, 2014, and U.S. Provisional Patent Application Ser. No. 62/010,364 filed Jun. 10, 2014

STATEMENT RE: FEDERALLY SPONSORED RESEARCH/DEVELOPMENT

Not Applicable

BACKGROUND OF THE INVENTION

1. Field of the Invention

The present invention relates generally to juvenile car seats or safety seats and, more particularly, to a harness pad which is adapted for retrofit attachment to a safety seat and to interface with prescribed portions of the harness system thereof, the harness pad being uniquely configured to extend over or span the top of the shoulder of a child secured within the safety seat to significantly impede any potential forward excursion of the child. In another embodiment, the harness pad is adapted for retrofit attachment to a booster seat and interface to a portion of the existing vehicle seat belt or restraining system used to maintain a child therein, such harness pad likewise being uniquely configured to extend over or span the top of the shoulder of a child secured within the booster seat to significantly impede any potential forward excursion of the child.

2. Description of the Related Art

As is well known in the field of juvenile safety products, a typical car seat or child safety seat comprises a rigid seat shell which is configured or contoured to accommodate a child. In addition to including padding to make the safety seat comfortable for the child, the shell is outfitted with a harness system which is operative to secure the child within the safety seat and restrain the child in the event of an accident.

The shell is typically secured to an existing vehicle seat using an arrangement of straps/belts. More particularly, currently known safety seats include a lower strap that is operative to facilitate the attachment of the shell to corresponding rigid attachment points provided within the vehicle seat of later model cars. This lower strap is in used in combination with an elongate tether of the safety seat which extends from the upper portion of the back of the shell to another rigid attachment point of the vehicle either on the vehicle seat or on a rear deck of the vehicle behind the vehicle seat. To allow for use in older model cars that may not be outfitted with the aforementioned rigid attachment points, currently known safety seats are also often provided with a passageway through the shell which is adapted to accommodate a vehicle seat belt in a manner wherein the passage of the seat belt through the passageway and engagement thereof to the corresponding belt buckle of the vehicle retains the safety seat in an operative position upon the vehicle seat.

The harness system used in currently know child safety seats to secure the child therein is generally referred to as five-point harness system. The five points in the name are the spots where the harness straps attach to the shell of the safety seat. Two of the points are at each shoulder, two of the points are at the child's hips, and the final point is where the harness straps buckle between the child's legs. Five-point harness systems are found on nearly all modern safety seats, having replaced the prior three-point harness systems which did not have attachment points at the child's hips.

In greater detail, FIG. 1 depicts a conventional prior art five-point harness system 10 of a safety seat 12. The five-point harness system 10 typically includes a pair of elongate shoulder straps 14 that are adapted to pass over respective ones of the child's shoulders on either side of the child's neck. More particularly, when viewed from the perspective shown in FIG. 1, upper portions 16 of the shoulder straps 14 are extensible over the child's shoulders and thereafter through respective ones of a corresponding pair of slots formed in a seatback portion of the shell at approximately the shoulders. The distal or terminal end regions of these upper portions 16 are typically affixed to a splitter plate that effectively joins the same to a corresponding end portion of a single, elongate adjustment strap. This adjustment strap extends behind and underneath the shell to a location as allows the same to be manipulated by a parent or caregiver as needed to selectively adjust the tension of the harness system.

As is apparent from FIG. 1, to accommodate the growth of the child, safety seats are typically provided with multiple slots pairs formed within the seatback portion of the shell. In this regard, as also viewed from the perspective shown in FIG. 1, the slots are formed in two spaced, generally vertical columns, with each of the slots of one column being horizontally aligned with a corresponding slot of the remaining column. As indicated above, the upper portions 16 of the shoulder straps 14 are advanced through respective ones of the slots of a corresponding, horizontally aligned pair thereof, with the preferred slot pair being those most closely aligned to the child's shoulders when positioned within the shell of the safety seat. The padding of the safety seat is itself provided with an array of slots which, when the padding is properly engaged to the shell, are generally aligned with respective ones of the slots formed within the shell.

In addition to the upper portion, each of the shoulder straps 14 defines a lower portion 18. The distal or terminal end regions of these lower portions 18 are affixed to prescribed locations or points of the shell in relative close proximity to the lower seat portion thereof. As is further shown in FIG. 1, the lower portions 18 are advanced through respective ones of an identically configured pair of lower connectors 20 which are each in turn releasably engageable to a common buckle 22. The buckle 22 is attached to one end of a lap belt or strap 24 which extends between the child's thighs when the child is seated in the safety seat, the opposite end of the lap belt 24 being secured to the shell. In certain safety seats, the upper portions 16 of the shoulder straps 14 are advanced through respective ones of an identically configured pair of upper connectors 26 which are releasably engageable to each other and, when attached to each other, collectively define a chest clip.

Certain juvenile safety seats as known in the prior art are further outfitted with a headrest which is movably mounted to the shell. The height/orientation of the headrest relative to the shell is selectively adjustable as needed to accommodate the growth of the child. Typically, the adjustment mechanism associated with the headrest is slidably mounted to the rear surface of the backrest portion of the shell. In these particular safety seats, the upper portions 16 of the shoulder straps 14, subsequent to being advanced through a corresponding pair of the slots within the shell in the aforementioned manner, are extended up and over a prescribed portion of the adjustment mechanism prior to being attached to the aforementioned splitter plate. In many safety seats outfitted with an adjustable headrest, an upper cross-bar member of the adjustment mechanism is that structural feature thereof over which the upper portions 16 of the shoulder straps 14 are extended prior to being attached to the splitter plate.

Also known in the field of juvenile products are booster seats. This type of seat meets all government standards as to safety and is appropriate for children from toddler up to a particular size, at which time the child becomes too large to fit into the above-described safety seat, but is still too small to properly use the restraining systems of standard automobiles, that is, the seat and/or harness shoulder straps in these systems. In this regard, many currently known booster seats include many of the aforementioned structural features of the safety seat (e.g., the padded shell, movable headrest), but are not outfitted with a harness system or an arrangement of straps/tethers operative to facilitate the attachment of the shell to corresponding rigid attachment points provided within the vehicle seat.

With particular regard to safety seats, there are changes in U.S. safety seat regulations which are to take effect in 2014. One of these changes is related to crash testing requirements using a crash test dummy corresponding to a ten (10) year old child. The result of this change is that many existing safety seats will face challenges in passing the new testing requirements for a child above sixty-five (65) pounds in a five-point harness. The present invention effectively overcomes this obstacle by providing harness pads which are adapted for retrofit attachment to the safety seat and to interface with prescribed portions of the above-described five-point harness system 10, and in particular to respective ones of the upper portions 16 of the shoulder straps 14 thereof. The harness pads of the present invention, when operatively engaged to the safety seat, are uniquely configured to extend over or span the top of the shoulders of a child secured within the safety seat in a manner which significantly impedes any potential forward excursion of the child. As a result, the safety seat as outfitted with the harness pads can be rated for children well above sixty-five pounds while still meeting new Federal regulations. In another embodiment, the harness pad is adapted for retrofit attachment to a booster seat and interface to a portion of the vehicle seat belt used to maintain a child therein, such harness pad likewise being uniquely configured to extend over or span the top of the shoulder of a child secured within the booster seat to significantly impede any potential forward excursion of the child. These, as well as other features and advantages of the present invention will be described in more detail below.

BRIEF SUMMARY OF THE INVENTION

In accordance with the present invention, there is provided a harness pad which is adapted for retrofit attachment to or inclusion as an original component of a juvenile safety seat, and to interface with a prescribed portion of a five-point harness system of such safety seat. In a preferred implementation, it is contemplated that an identically configured pair of harness pads of the present invention will be cooperatively engaged to the shell of the safety seat and interfaced to respective ones of the existing shoulder straps of the five-point harness system. The harness pads, when cooperatively engaged to the safety seat and interfaced to the five-point harness system thereof, are uniquely configured to extend over or span the top of the shoulders of a child secured within the safety seat in a manner which significantly impedes any potential forward excursion of the child.

Further in accordance with the present invention, there is provided a harness pad which is adapted for retrofit attachment to or inclusion as an original component of a juvenile booster seat, and to interface with a prescribed portion of an existing vehicle restraining system used to maintain a child in such booster seat. In a preferred implementation, it is contemplated that one harness pad of the present invention will be cooperatively engaged to the shell of the booster seat and interfaced to the shoulder strap of the existing vehicle restraining system. The harness pad, when cooperatively engaged to the booster seat and interfaced to the shoulder strap of the restraining system, is likewise uniquely configured to extend over or span the top of one shoulder of a child secured within the booster seat in a manner which significantly impedes any potential forward excursion of the child.

Each harness pad comprises an elongate strap member which preferably has a multi-layer construction. More particularly, the strap member includes first and second layers which are attached to each other, preferably via stitching. The first layer of the strap member is of a first prescribed length, defines opposed first and second ends, and is preferably fabricated from a strong, highly durable knit or woven fabric material. The second layer of the strap member is of a second prescribed length less than the first length, defines opposed first and second ends, and is preferably fabricated from a rubberized grip material. The first and second layers are attached to each other in manner wherein, as a result of their disparate lengths, the first ends are substantially flush with each other, with the second end of the second layer terminating short of the second end of the first layer by a prescribed distance.

The harness pad further comprises an engagement member, such as a buckle, which is preferably fabricated from metal, and is attached to the first layer of the strap member proximate the second end defined thereby. For use in a safety seat application, the engagement member is sized and configured to be extensible through any one of the aforementioned slots formed in the seatback portion of the shell of a safety seat, and to operatively engage the shell when the safety seat having the harness pads retrofit thereto is properly interfaced to a child within the safety seat. In an alternative embodiment, which may be the most suitable for use in a booster seat application, the harness pad does not include the engagement member, the cooperative engagement of the harness pad to the safety seat or the booster seat being facilitated by a loop defined by the strap member.

For the safety seat application, the distance between the second end of the second layer and the second end of the first layer is selected such that the portion of the strap member which, along with the buckle (if included), is advanced through the slot of the shell and extends behind the seatback portion thereof is defined solely by the first layer, the second layer thus terminating at approximately the seatback portion of the shell when the harness pad is retrofit to the five-point harness system. Similarly, for the booster seat application, the distance between the second end of the second layer and the second end of the first layer is selected such that the portion of the strap member which, along with the buckle (if included), extends behind the seatback portion of the shell thereof is defined solely by the first layer, the second layer thus terminating at approximately the seatback portion of the shell when the harness pad is retrofit to the shoulder strap of the existing vehicle restraining system. However, a variant of the harness pad wherein the first and second layers of the strap member are of equal length is contemplated as well. It is further contemplated that the second layer may simply comprise a layer of a rubberized grip material applied directly to one side or face of the first layer, rather than comprising a separate element sewn or otherwise attached to the first layer.

The harness pad further comprises a pad member which is attached to the strap member, and is configured to be releasably engageable to a prescribed segment or section of a corresponding one of the shoulder straps of the five-point harness system, or to the shoulder strap of the existing vehicle restraining system. The pad member preferably has a multi-layer construction, comprising a foam layer having a knit fabric material layer adhered to one side or face thereof, and a non-woven material layer (e.g., netting) adhered to the opposite side or face thereof.

In one embodiment, the pad member defines separate first and second pad sections which are each of a prescribed width, and separated by from each other by an opposed pair of gaps which are each of a prescribed width as well. Each of the first and second pad sections defines an opposed pair of distal flap portions. Disposed on opposing surfaces of these flap portions are strips of hook and loop fastener material (e.g., Velcro®). These strips are oriented to extend in spaced, generally parallel relation to the corresponding strap member. In this regard, the wrapping of the flap portions of each of the first and second pad sections of the pad member about the corresponding shoulder strap of the five-point harness system or shoulder strap of the existing vehicle restraining system allows the strips of hook and loop fastener material disposed thereon to releasably engage each other in a manner maintaining the pad member (and hence the corresponding harness pad) upon the shoulder strap. The gaps between the first and second sections of the pad member may be used to accommodate structural features such as the above-described upper connectors or chest clip used in conjunction with many existing five point harness systems. However, a variant of the harness pad wherein the pad member has a generally rectangular or quadrangular configuration not including the aforementioned gaps is contemplated as well, and may be more suitable for the booster seat application. A further variant is also contemplated wherein the pad member does not include any fastening strips, but rather is simply provided with slots or openings proximate respective ones of an opposed pair of ends thereof as allow for the passage or threading of the corresponding shoulder strap of the safety seat through the pad member.

Further in accordance with the present invention, there is provided a method of retrofitting harness pads constructed in accordance with the present invention to an existing safety seat having a five-point harness system. In one exemplary retrofit method, the pad member of each harness pad is placed under a corresponding one of the shoulder straps of the harness system such that the rubberized second layer of the strap member thereof will face a child positioned within the safety seat. Thereafter, the engagement member or buckle of the harness pad is advanced completely through the same slot of the seatback portion of shell through which the corresponding shoulder strap extends, the engagement member thereafter being advanced through the slot immediately below such slot. As a result, the engagement member is ultimately abutted against a portion of the front surface of the seatback portion of the shell. The flap portions of the pad member are then wrapped or folded over the shoulder strap in the aforementioned manner to secure the harness pad thereto. The child is then placed within the safety seat. The tension on the harness system is then adjusted in a conventional manner to ensure that the shoulder straps and harness pads interfaced thereto fit smoothly and snugly on the child. The upper connectors of the chest clip, if included in the harness system, may then be secured to each other, such upper connectors either being accommodated by the gaps of the pad members of the harness pads (if such gaps are included in the pad members) or located above the pad members of the harness pads if no gaps are included therein. A variant of the retrofit method wherein the harness pad defining the aforementioned loop in lieu of the engagement member is retrofit to a safety seat outfitted with a headrest basically follows the same sequence of steps set forth above. However, due to the absence of the engagement member, the advancement of the loop defined by the strap member of the harness pad through that slot through which the corresponding shoulder strap extends is followed by the slidable advancement of such loop over a corresponding end of the above-described upper cross-bar member of the headrest adjustment mechanism.

Still further in accordance with the present invention, there is provided a method of retrofitting a harness pad constructed in accordance with the present invention to an existing booster seat. In one exemplary retrofit method, the pad member of the harness pad is placed under the shoulder strap of the existing vehicle restraining system such that the rubberized second layer of the strap member thereof will face a child positioned within the booster seat. Thereafter, the strap member is advanced over the top edge of a shoulder region of the shell of the booster seat. In one implementation, the engagement member or loop of the harness pad is secured to a prescribed portion of the shell along the rear surface of the seatback portion thereof, such attachment being either removable or permanent. In another implementation, the engagement member or loop of the harness pad is secured to a prescribed portion of the headrest of the booster seat movably mounted to the shell thereof (e.g., a shoulder strap/belt guide included on the headrest), such attachment also being either removable or permanent. The flap portions of the pad member are then wrapped or folded over the shoulder strap of the existing restraining system in the aforementioned manner to secure the harness pad thereto. The child is then placed within the booster seat, and secured therein by advancing the shoulder strap of the existing restraining system over the child in a conventional manner.

The present invention is best understood by reference to the following detailed description when read in conjunction with the accompanying drawings.

BRIEF DESCRIPTION OF THE DRAWINGS

These, as well as other features of the present invention, will become more apparent upon reference to the drawings wherein:

FIG. 4 is a front elevational view of the strap member of the harness pad shown in FIGS. 2 and 3;

FIG. 5 is a side elevational view of the strap member shown in FIG. 4;

FIG. 6 is a partial cross-sectional view of the pad member of the harness pad shown in FIGS. 2 and 3;

FIG. 7 is a front elevational view of a harness pad constructed in accordance with a second embodiment of the present invention and adapted for retrofit attachment to the safety seat including the harness system shown in FIG. 1;

FIGS. 8-10 are drawings depicting an exemplary sequence of steps for retrofitting harness pads constructed in accordance with the present invention to a juvenile safety seat;

Common reference numerals are used throughout the drawings and detailed description to indicate like elements.

DETAILED DESCRIPTION OF THE INVENTION

Figure 1:
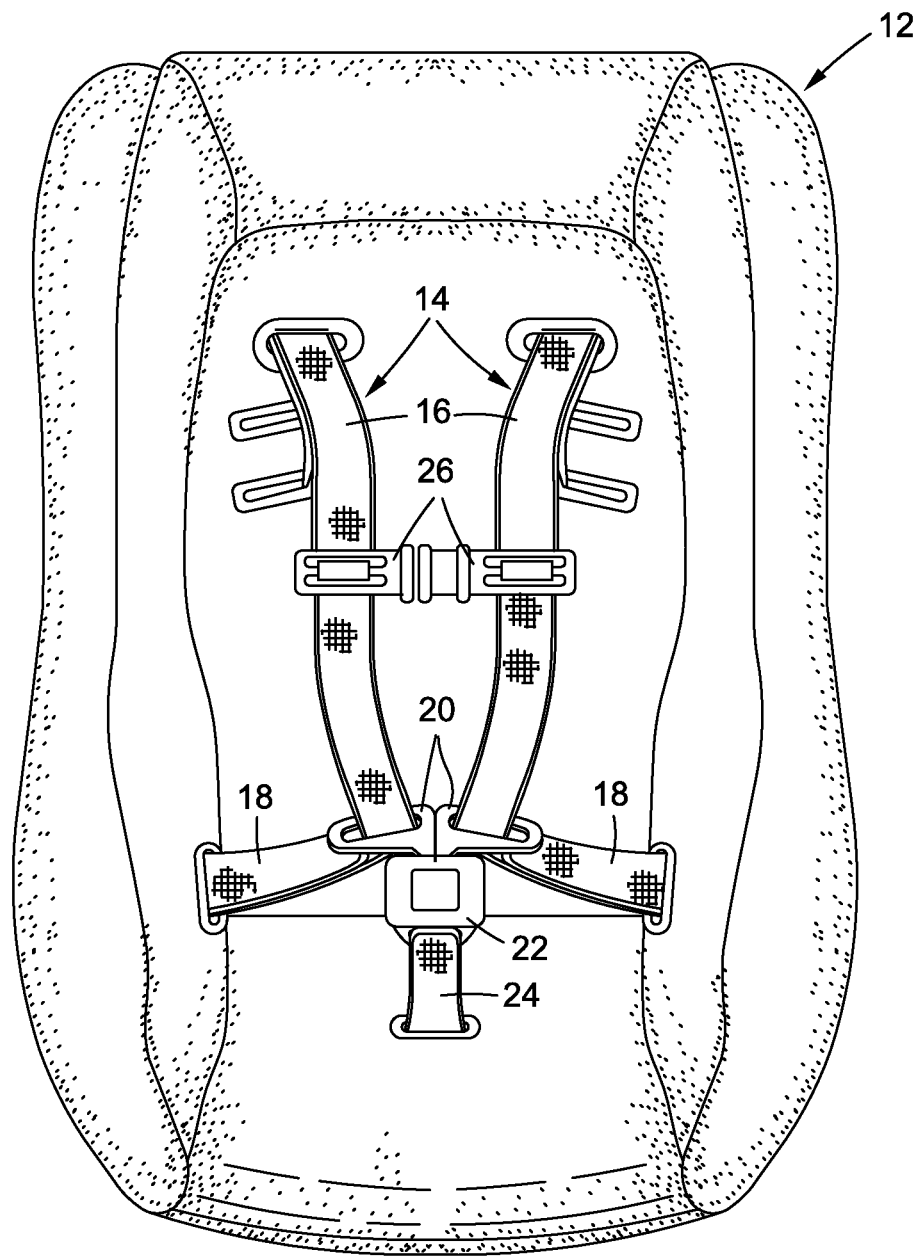
FIG. 1 is a front elevational view of a prior art juvenile safety seat, depicting the strap/belt arrangement of a five-point harness system thereof.

Referring now to the drawings for which the showings are for purposes of illustrating preferred embodiments of the present invention only, and not for purposes of limiting the same, FIGS. 2-6 depict a harness pad 30 constructed in accordance with a first embodiment of the present invention. It is to be understood that any reference to a "harness system" in the following paragraphs is intended to correspond to a five-point harness system including those structural features shown and described above in relation to FIG. 1. Additionally, it will be recognized by those of ordinary skill in the art that the various dimensional parameters labeled in FIGS. 2-5 corresponding to the harness pad 30 are exemplary only, and may be selectively varied without departing from the spirit and scope of the present invention.

The harness pad 30 comprises an elongate strap member 32 which, as indicated above, preferably has a multi-layer construction. In greater detail, the strap member 32 includes a first layer 34 and a second layer 36 which are attached to each other. In a preferred embodiment, stitching is used to attach the first and second layers 34, 36 to each other, though alternative attachment methods are considered to be within the spirit and scope of the present invention.

The first layer 34 of the strap member 32 is of a first prescribed length, and defines opposed first and second ends 38, 40. In addition, the first layer 34 is preferably fabricated from a strong, highly durable knit or woven fabric material. The second layer 36 of the strap member 32 is of a second prescribed length which is preferably less than the first length of the first layer 34. The second layer 36 also defines opposed first and second ends 42, 44, and is preferably fabricated from a rubberized grip material which may have a prescribed level of tackiness. As is most apparent from FIG. 4, the first and second layers 34, 36 are attached to each other in a manner wherein, as a result of their disparate lengths, the first ends 38, 42 are substantially flush with each other, with the second end 44 of the second layer 36 terminating short of the second end 40 of the first layer 34 by a prescribed distance. However, a variant of the harness pad 30 is contemplated wherein the first and second layers 34, 36 of the strap member 32 are of equal length, rather than being of disparate lengths. It is also contemplated that the second layer 36 may simply comprise a layer of a rubberized grip material applied directly to one side or face of the first layer 34, rather than comprising a separate element sewn or otherwise attached to the first layer 34.

As is most apparent from FIG. 5, a portion of the first layer 34 is folded over and secured to itself (preferably via stitching) to define a loop proximate the second end 40, the use of such loop being discussed in more detail below. As such, the second end 40 of the first layer 34 as labeled in FIG. 5 is not defined by the actual terminal end 41 of the first layer 34 opposite the first end 38 thereof, but rather by the fold formed within the first layer 34 to facilitate the aforementioned overlap.

The harness pad 30 further comprises on engagement member 46, such as a buckle, which is attached to the first layer 34 of the strap member 32 proximate the second end 40 defined thereby. In greater detail, the attachment of the engagement member 46 to the first layer 34 is preferably facilitated by advancing the terminal end 41 of the first layer 34 through a pair of openings defined by the engagement member 46 in sequence, and thereafter securing the folded over portion of the first layer 34 to the remainder thereof in the above-described manner. As a result, a crossbar portion of the engagement member 46 segregating the openings thereof from each other is effectively retained or captured within the aforementioned loop defined by the first layer 34. The engagement member 46 is preferably fabricated from a metal or plastic material, though metal is the preferred material based on its increased level of strength or structural integrity. Though depicted as having a generally quadrangular configuration in FIG. 4, the engagement member 46 may be provided in anyone of a multiplicity of different shapes or configurations. The primary requirement is that the engagement member 46 be sized and configured to be extensible through any one of the slots formed in the seatback portion of the shell of a safety seat, and to operatively engage the shell when the harness system of the safety seat having the harness pads 30 retrofit thereto is properly interfaced to a child within the safety seat.

The harness pad 30 further comprises a pad member 50 which is attached to the strap member 32, and more particularly to the first layer 34 thereof. As will be discussed in more detail below, the pad member 50 is configured to be releasably engageable to a prescribed segment or section of a corresponding one of the shoulder straps 14 of the harness system. In the embodiment shown in FIGS. 2 and 3, the pad member 50 defines a first pad section 52 and a second pad section 54 which are separated from each other by an opposed pair of gaps 56. The gaps 56 are preferably identically configured to each other, and each of a prescribed width. In an exemplary embodiment, the first pad section 52 of the pad member 50 has a generally quadrangular (e.g., rectangular) configuration, defining an opposed, identically configured pair of distal flap portions 58. Similarly, the second pad section 54 has a generally quadrangular (e.g., square) configuration itself defining an opposed, identically configured pair of distal flap portions 60. When the pad member 50 is secured to the strap member 32, one peripheral side of the second pad section 54 extending between the flap portions 60 defined thereby is substantially flush with the aligned second ends 38, 42 of the first and second layers 34, 36 of the strap member 32.

Disposed on opposing surfaces of the flap portions 58 defined by the first pad section 52 are strips 62 of hook and loop fastener material (i.e., Velcro®). Similarly, disposed on opposing surfaces of the flap portions 60 defined by the second pad section 54 are such strips 62 of hook and loop fastener material. As is also apparent from FIGS. 2 and 3, each of the strips 62 is attached to a corresponding one of the flap portions 58, 60 so as to extend in spaced, generally parallel relation to the strap member 32. As will also be discussed in more detail below, the wrapping of the flap portions 58, 60 of each of the first and second pad sections 52, 54 about the corresponding shoulder strap 14 of the harness system allows the strips 62 of hook and loop fastener material disposed thereon to releasably engage each other in a manner maintaining the pad member 50 (and hence the corresponding harness pad 30) upon the shoulder strap 14.

Figure 2:
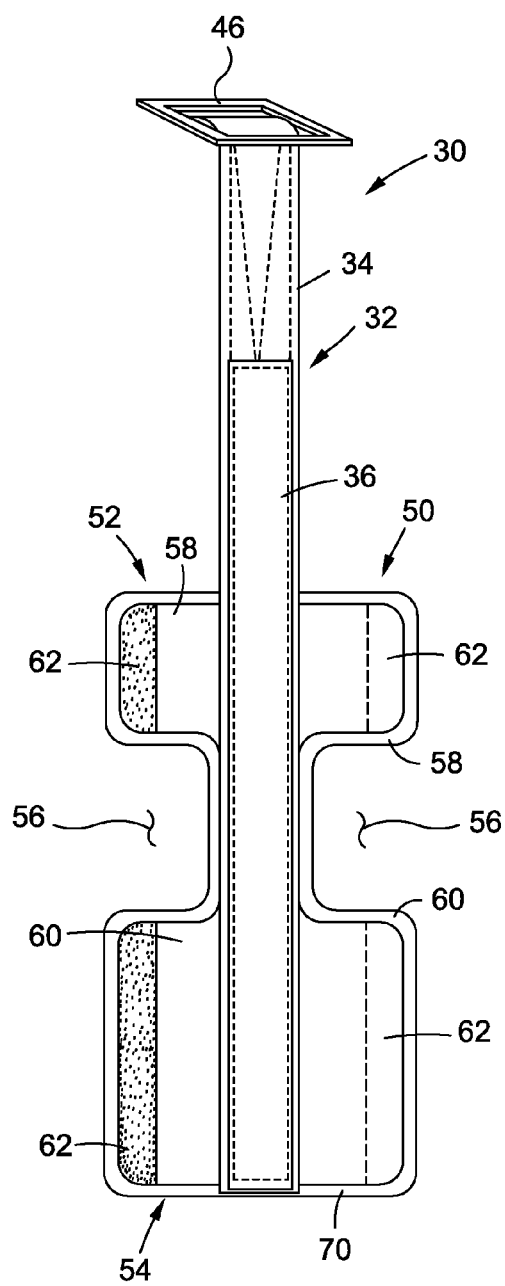
FIG. 2 is a front elevational view of a harness pad constructed in accordance with a first embodiment of the present invention and adapted for retrofit attachment to the safety seat including the harness system shown in FIG. 1.
Figure 3:
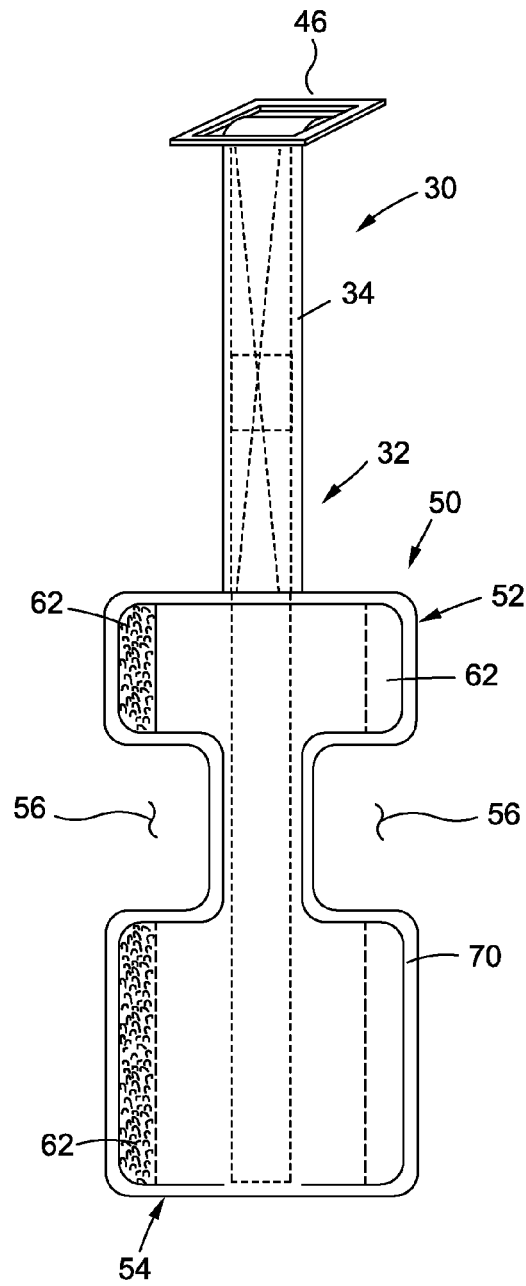
FIG. 3 is a rear elevational view of a harness pad shown in FIG. 2.

As seen in FIG. 6, the pad member 50 preferably has a multi-layer construction. In greater detail, the pad member 50 preferably comprises a foam layer 64 having a knit fabric material layer 66 adhered to one side or face thereof, and a non-woven material layer 68 (e.g., netting) adhered to the opposite side or face thereof. In addition, as is seen in FIGS. 2 and 3, the pad member 50 further preferably includes a continuous edge binding 70 which extends about the entire periphery thereof. Though not shown, a variant is contemplated wherein the pad member 50 does not include any fastening strips 62, but rather is simply provided with slots or openings proximate respective ones of an opposed pair of ends thereof as allow for the passage or threading of the corresponding shoulder strap 14 through the pad member 50.

Referring now to FIG. 7, there shown a harness pad 130 constructed in accordance with a second embodiment of the present invention. The primary distinction between the harness pads 30, 130 lies in the shape of the pad member 150 of the harness pad 130 in comparison to the pad member 50 of the harness pad 30. More particularly, in the harness pad 130, the pad member 150 has a generally quadrangular (e.g., rectangular) configuration, devoid of the above-described gaps 56. In this regard, the pad member 150 defines an opposed, identically configured pair of distal flap portions 158. Disposed on opposing surfaces of the flap portions 158 are the strips 62 of hook and loop fastener material. The wrapping of the flap portions 158 about the corresponding shoulder strap 14 of the harness system allows the strips 62 of hook and loop fastener material disposed thereon to releasably engage each other in a manner maintaining the pad number 150 (and hence the corresponding harness pad 130) upon the shoulder strap 14. As with the harness pad 30, a variant of the harness pad 130 is contemplated wherein the pad member 150 does not include any fastening strips 62, but rather is simply provided with slots or openings proximate respective ones of an opposed pair of ends thereof as allow for the passage or threading of the corresponding shoulder strap 14 through the pad member 150.

Having thus described the structural features of the harness pads 30, 130, an exemplary method of retrofitting the same to an existing safety seat will now be described with specific reference to FIGS. 8-14.

Figure 11:
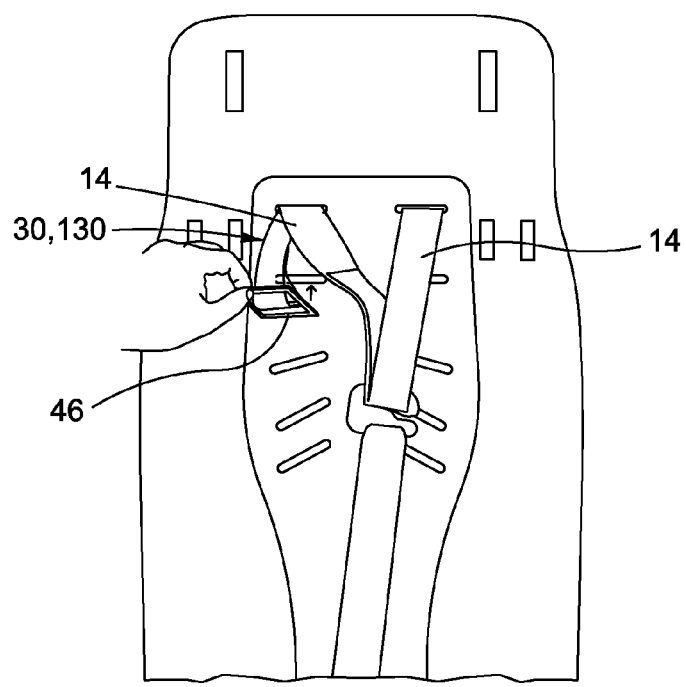
FIG. 11 is a photograph corresponding to the retrofit step depicted in FIG. 9.
Figure 12:
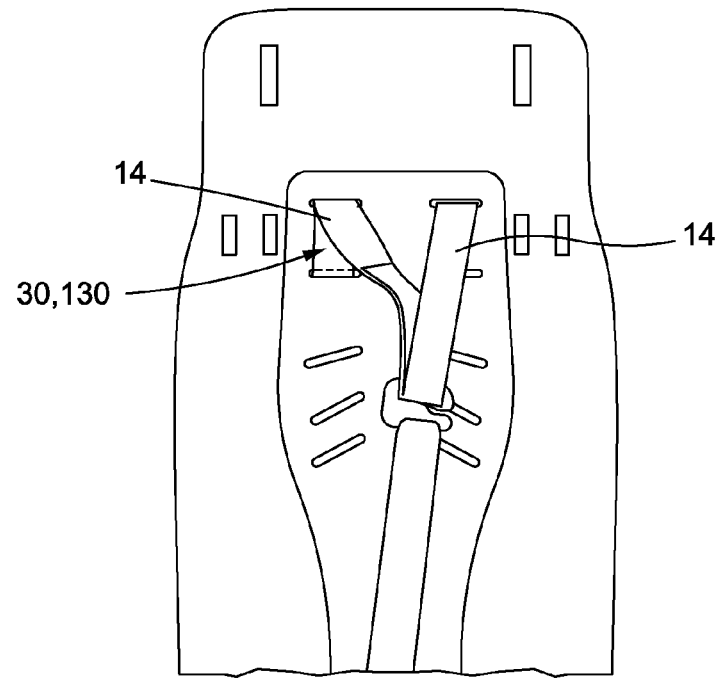
FIG. 12 is a photograph depicting the rear surface of the seatback portion of the shell of the safety seat with one harness pad cooperatively engaged thereto.
Figure 13:
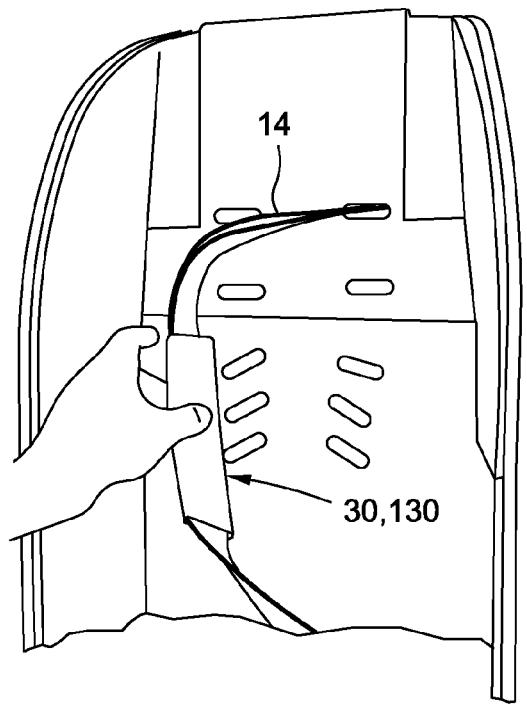
FIGS. 13 and 14 are photographs depicting the front surface of the seatback portion of the shell of the safety seat with one harness pad cooperatively engaged to a corresponding shoulder strap of the harness system.
Figure 14:
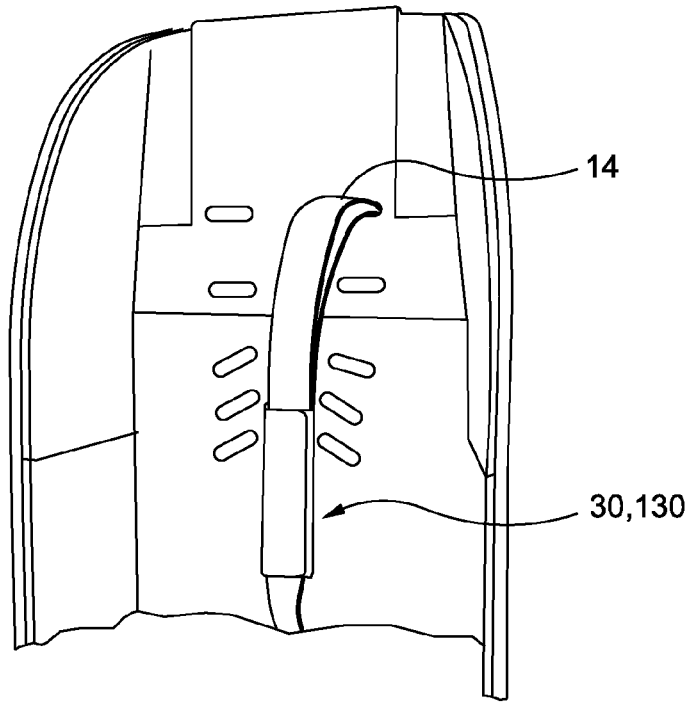

In the initial step of the retrofit method shown in FIG. 8, the pad member 50, 150 of each harness pad 30, 130 is placed under a corresponding one of the shoulder straps 14 such that the second layer 36 thereof will face a child positioned within the safety seat. Thereafter, as shown in FIGS. 9 and 11, the engagement member 46 of each harness pad 30, 130 is advanced completely through that slot of the seatback portion of the shell through which the corresponding shoulder strap 14 extends, the engagement member 46 thereafter being advanced through the slot immediately below such slot. As a result, as is seen in FIGS. 10, 13 and 14, each engagement member 46 is ultimately abutted against a corresponding portion of the front surface of the seatback portion of the shell.

In the next step of the retrofit method, the flap portions 58, 60, 158 of the pad member 50, 150 of each harness pad 30, 130 are wrapped or folded over the corresponding shoulder strap 14 in the aforementioned manner to effectively secure the harness pads 30, 130 to the shoulder straps 14. The child is then placed within the safety seat. After placing the harness system upon the seated child in a conventional manner, the tension thereon is then adjusted to ensure that the shoulder straps 14 and harness pads 30, 130 extending therealong fit smoothly and snugly on the child. The upper connectors 26 of the chest clip, if included in the harness system, may then be secured to each other, such upper connectors 26 either being accommodated by the gaps 56 of the pad members 50 of the harness pads 30, or located above the pad members 150 of the harness pads 130.

In either of the harness pads 30, 130, the distance between the second end 44 of the second layer 36 and the second end 40 of the first layer 34 is selected such that the portion of the strap member 32 which, along with the engagement member 46, is advanced through the slot of the shell and extends behind the seatback portion thereof is defined solely by the first layer 34. As such, the second layer 36 terminates at approximately the seatback portion of the shell when the harness pads 30, 130 are retrofit to the harness system. However, as indicated above, a variant of the harness pads 30, 130 is contemplated wherein the first and second layers 34, 36 of the strap member 32 are of equal length, rather than being of disparate lengths. In this regard, the criticality lies in the lengths of the gripping second layers 36 of the harness pads 30, 130 being sufficient to extend over or span the tops of corresponding shoulders of a child secured within the safety seat when the harness pads 30, 130 are properly retrofit to the safety seat. As previously explained, such engagement significantly impedes any potential forward excursion of the child as allows the safety seat as outfitted with the harness pads 30, 130 to be rated for children well above sixty-five pounds while still meeting new Federal regulations. As used herein, the term "span" is intended to be indicative of a position or state of the gripping second layers 36 of the harness pads 30, 130 wherein, as a result of the lengths thereof, they are able to follow the curvature of corresponding ones of the shoulders of the child within the safety seat as outfitted with the harness pads 30, 130. In greater detail, as is most apparent from FIG. 10, the gripping second layers 36 of the harness pads 30, 130 are each sized and configured to extend from a position overlapping the child's chest (i.e., proximate the child's sternum and below the collarbone), and over the top or crest of a corresponding one the child's shoulders, thus following and conforming to at least a portion of the shoulder curvature of the child.

In the harness pads 30, 130 of the present invention, the manner in which the pad members 50, 150 engage the corresponding shoulder straps 14 allows such shoulder straps 14 to slide through the harness pads 50, 150, thereby facilitating the adjustment of the shoulder straps 14 around the child in the safety seat. Yet, because the harness pads 30, 130 are cooperatively engaged to the safety seat, as the child's shoulders bear against the grip surfaces defined by the strap members 32, the harness pads 30, 130 will remain in place (i.e., will not slide relative to the safety seat and harness system). As such, since the child's shoulders are bearing against a fractioned surface of an immovable portion of the safety seat, the movement of the child is significantly reduced.

Figure 15:
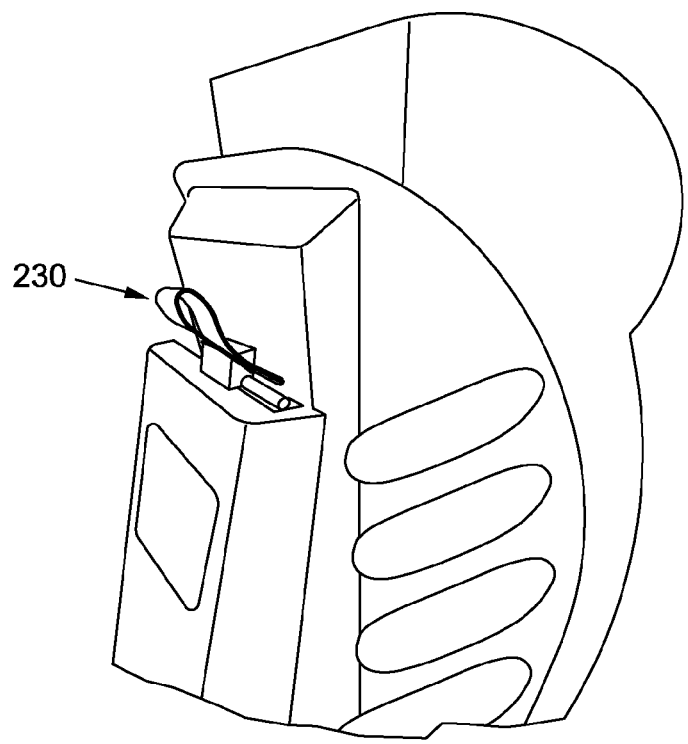
FIGS. 15-16 are photographs depicting an exemplary sequence of steps for retrofitting harness pads constructed in accordance with a third embodiment of the present invention to a juvenile safety seat outfitted with a headrest assembly.
Figure 16:
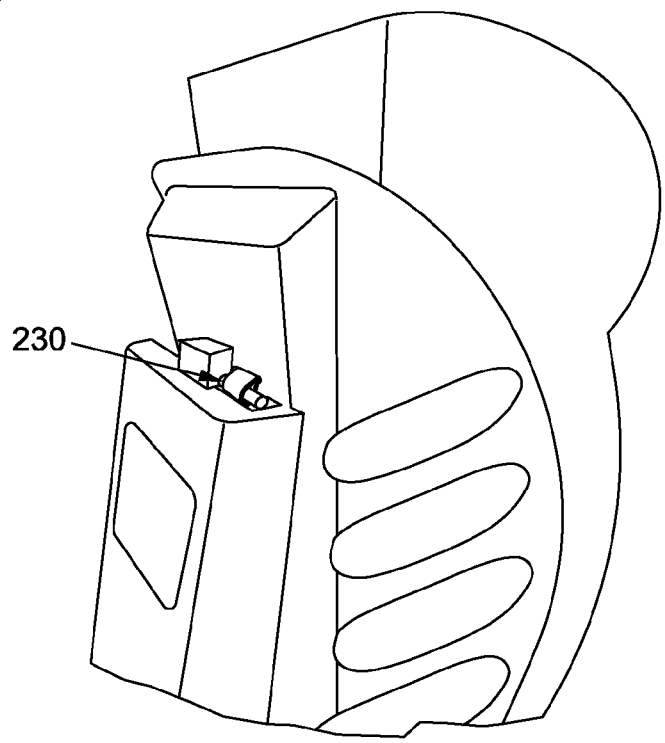
Figure 17:
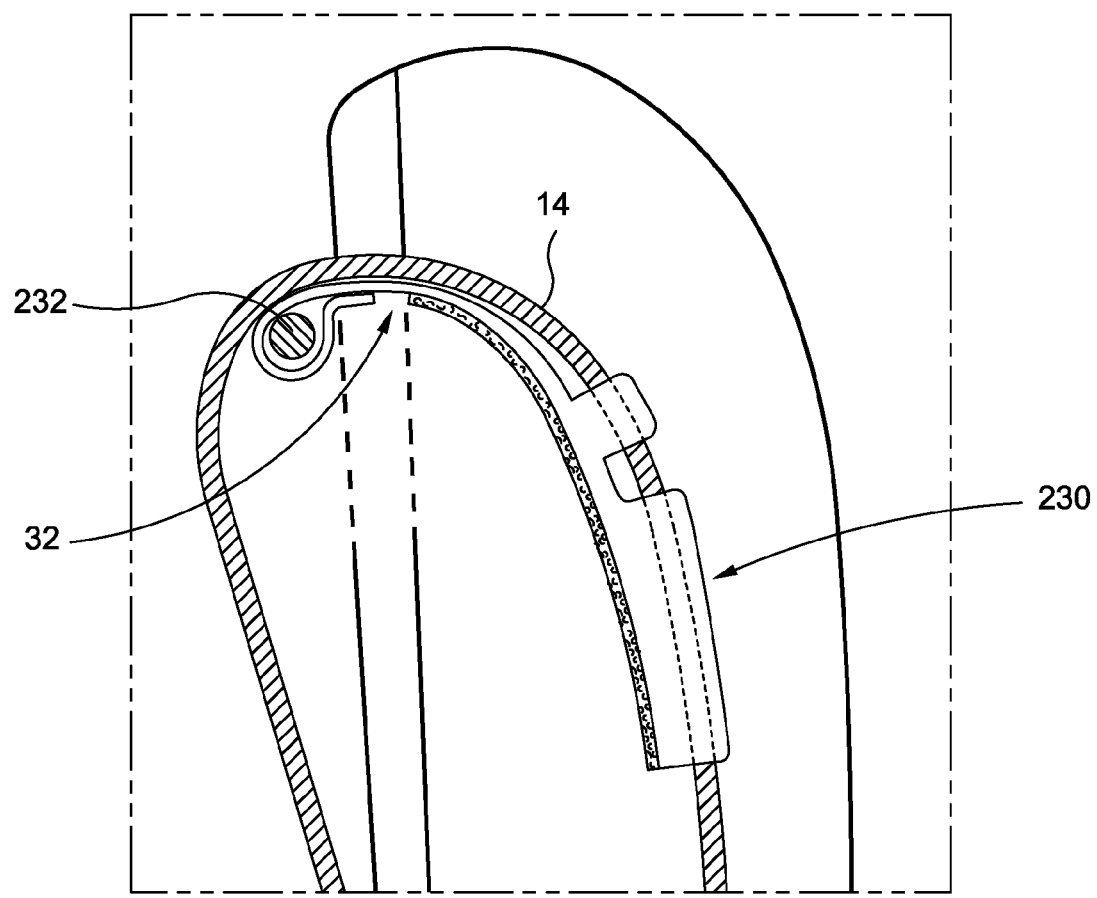
FIG. 17 is a drawing depicting a harness pad constructed in accordance with the third embodiment of the present invention as cooperatively engaged to a juvenile safety seat outfitted with a headrest assembly.

Referring now to the FIGS. 15-17, is contemplated that in accordance with a third embodiment of the present invention, a harness pad 230 may be provided which is substantially similar to either of the above-described harness pads 30, 130, with the sole distinction lying in the absence of the engagement member 46 in the harness pad 230. In this regard, the harness pad 230 is specifically suited for use in conjunction with the above-described juvenile safety seats as outfitted with a headrest which is movably mounted to the shell. As explained above, in these types of safety seats, the height/orientation of the headrest relative to the shell is selectively adjustable via an adjustment mechanism slidably mounted to the rear surface of the backrest portion of the shell.

The manner of retrofitting the harness pads 230 to the safety seat outfitted with the headrest basically follows the same sequence of steps set forth above. However, due to the absence of the engagement members 46, the advancement of the loop defined by the strap member 32 of each harness pad 230 through that slot through which the corresponding shoulder strap 14 extends is followed by the slidable advancement of such loop over a corresponding end of the above-described upper cross-bar member 232 of the adjustment mechanism in the manner shown in FIGS. 16 and 17.

Though not shown, it is also contemplated that harness pads having the structural and functional features highlighted above may be implemented in a non-retrofit application, i.e., may be original components of or permanently attached to the safety seat. In this regard, the harness pads of the present invention may be permanently attached to prescribed portions of the safety seat as allows them to be cooperatively engaged to the harness system thereof in the aforementioned manner. Along these lines, for child safety seats without the aforementioned harness slots in the seatback portion of the shell (i.e., safety seats in which the harness height is adjustable by moving the headrest up or down), the harness pads of the present invention may be permanently attached to a movable portion of the safety seat (e.g., the aforementioned cross-bar member 232), since it may not otherwise be necessary to have the ability to remove the harness pads from the safety seat.

Figure 18:
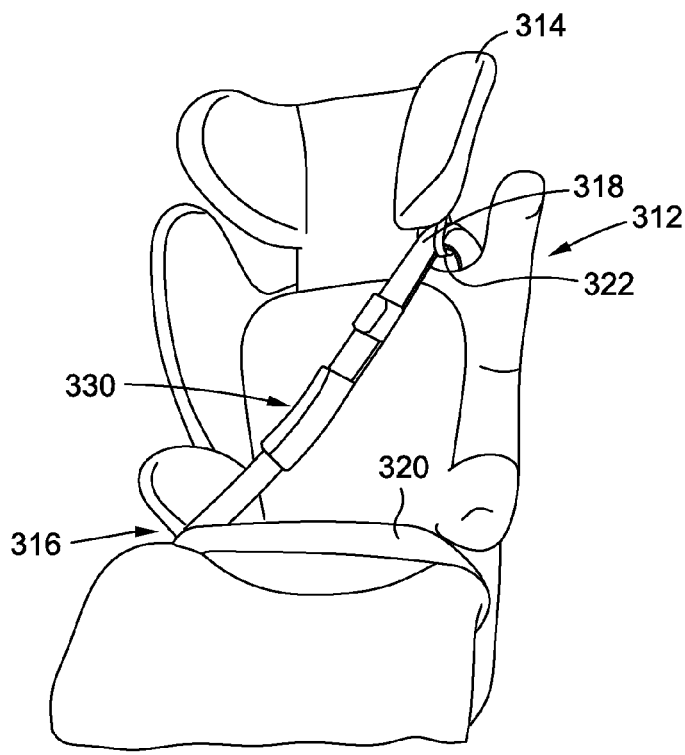
FIGS. 18-19 are photographs depicting a harness pad constructed in accordance with the present invention as cooperatively engaged to a booster seat outfitted with a movable headrest.
Figure 19:
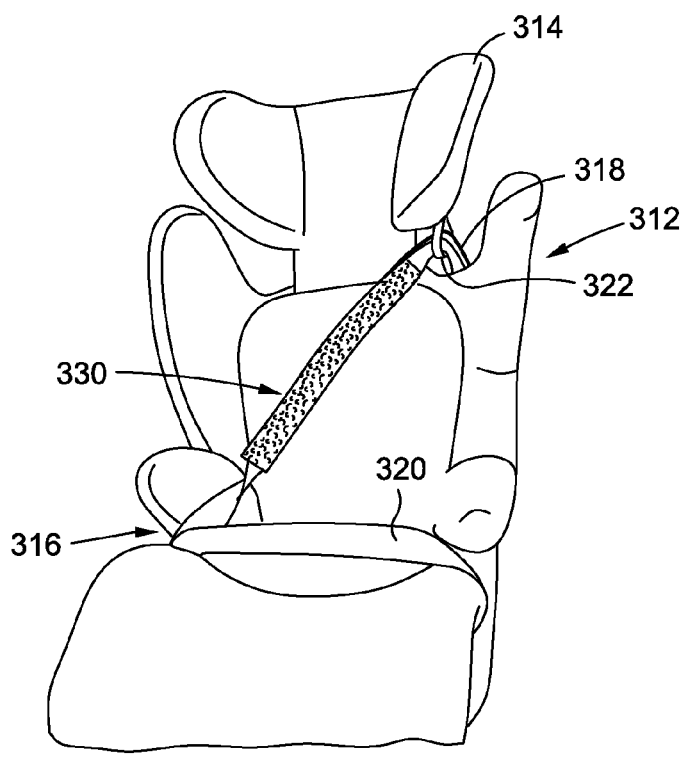

Referring now to FIGS. 18 and 19, further in accordance with the present invention, it is contemplated that a harness pad 330, the structural attributes of which closely mirror those of any one of the above-described harness pads 30, 130, 230, may be cooperatively engaged to a child booster seat 312. Similar to the safety seat 12 described above, the exemplary booster seat 312 shown in FIGS. 18 and 19 comprises a rigid seat shell which is configured or contoured to accommodate a toddler or older child. The shell is covered with a cushion or padding layer to make it comfortable for the child. The booster seat 312 is outfitted with a movable headrest 314, the position of which relative to the shell is selectively adjustable as may be needed to accommodate the current size and subsequent growth of the child.

The harness pad 330 is adapted for retrofit attachment to the booster seat 312 and to interface with a prescribed portion of an existing vehicle restraining system 316 used to maintain a child in such booster seat 312. Such existing restraining system 316 typically comprises an elongate shoulder belt or strap having the male buckle portion of a seat buckle slidably mounted thereto. As shown in FIGS. 18 and 19, as a result of the manner in which the opposed end portions of the shoulder strap are mounted to the vehicle, the receipt of the male buckle portion into a complimentary female buckle portion of the seat buckle also mounted to the vehicle seat results in an upper portion 318 of the shoulder strap extending generally diagonally (typically across the chest of a passenger secured by the restraining system), and a lower portion 320 of the shoulder strap extending generally horizontally (typically across the lap of a passenger secured by the restraining system). When used in conjunction with the exemplary booster seat 312 shown in FIGS. 18 and 19, the upper portion 318 of the shoulder strap is advanced through and accommodated by a ring-like shoulder strap guide 322 which is secured to the headrest 314. In addition, the lower portion 320 of the shoulder strap is accommodated by an opposed pair of complimentary channels defined between the seatback portion of the shell and the base or seat portion thereof.

It is contemplated that the primary distinction(s) between the one harness pad 330 used in conjunction with the booster seat 312 and the harness pads 30, 130, 230 described above may lie in the length of the strap member of the harness pad 330 exceeding that of the harness pads 30, 130, 230, and/or the harness pad 330 being outfitted with an engagement member which differs from the above-described buckle or loop. With greater particularity, it is contemplated that any engagement member or portion provided on the strap member of the harness pad 330 will be adapted to be secured (either removeably or permanently) to a prescribed portion of the shell of the booster seat 312 along the rear surface of the seatback portion thereof, or secured (either removeably or permanently) to a prescribed portion of the headrest 314 of the booster seat 312 (e.g., the strap guide 322). In all other respects, in a preferred implementation of the harness pad 330, the strap and pad members thereof will have the same construction as the strap and pad members 32, 50 (and variants thereof) as described above.

As is also shown in FIGS. 18 and 19, in its intended manner of use, the harness pad 330 of the present invention will be cooperatively engaged to the shell of the booster seat 312 and interfaced to the upper portion 318 of the shoulder strap of the existing vehicle restraining system. The harness pad 330, when retrofit to the booster seat 312 and interfaced to the shoulder strap of the restraining system is, like the harness pads 30, 130, 230, uniquely configured to extend over or span the top of one shoulder of a child secured within the booster seat 312 by the existing restraining system in a manner which significantly impedes any potential forward excursion of the child. With greater particularity, the gripping surface of the harness pad 330 extends along the child's chest and over the child's shoulder as provides such impediment to the forward movement of the child. Along these lines, the aforementioned use of the term "span" to describe the relationship been the harness pad 330 (as used in conjunction with the booster seat 312) and one shoulder of a child within the booster seat 330 is intended to be consistent to the use of that term in association with the harness pads 30, 130 as discussed above.

In one exemplary retrofit method of retrofitting the harness pad 330 to the existing booster seat 312, the pad member of the harness pad 330 is placed under the upper portion 318 of the shoulder strap of the existing vehicle restraining system such that the gripping surface (e.g., rubberized second layer) of the strap member of the harness pad 330 will face a child positioned within the booster seat 312. Thereafter, the strap member of the harness pad 330 is advanced over the top edge of a shoulder region of the shell of the booster seat 312 in the manner shown in FIGS. 18 and 19. As indicated above, in one implementation, the engagement member (or loop) of the harness pad 330 may be secured to a prescribed portion of the shell along the rear surface of the seatback portion thereof, such attachment being either removable or permanent. In this instance, the strap member will typically be extended or wrapped over the top edge of a shoulder region of the shell of the booster seat 312. In another implementation, the engagement member (or loop) of the harness pad 330 may be secured to a prescribed portion of the headrest 314 of the booster seat 312 (e.g., the strap guide 322), such attachment also being either removable or permanent. In this instance, the strap member will typically bridge or span a portion of one of the opposed gaps defined between the top edge of a shoulder region of the shell of the booster seat 312 and the headrest 314 thereof. The flap portions of the pad member are then wrapped or folded over the upper potion 318 of the shoulder strap of the existing restraining system in the aforementioned manner to secure the harness pad 330 thereto. The child is then placed within the booster seat 312, and secured therein by advancing the shoulder strap of the existing restraining system over the child in a conventional manner as shown in FIGS. 18 and 19 as well.

It is also contemplated that a harness pad having the structural and functional features highlighted above may also be implemented in a non-retrofit application when used in conjunction with a booster seat, i.e., may be an original component of or permanently attached to the booster seat. In this regard, the harness pad of the present invention may be permanently attached to a prescribed portion of the booster seat as allows it to be cooperatively engaged to the existing restraining system of the vehicle in the aforementioned manner.

Figure 20:
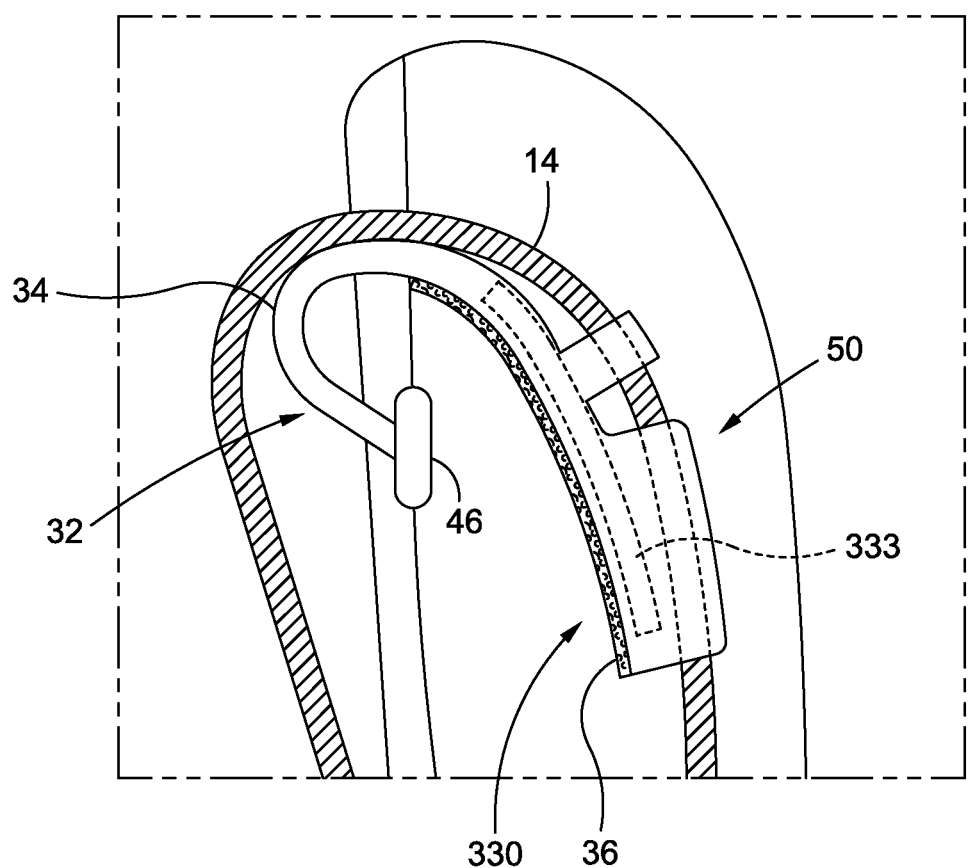
FIG. 20 is a drawing depicting a harness pad constructed in accordance with a fourth embodiment of the present invention as cooperatively engaged to a juvenile safety seat.

Referring now to the FIG. 20, is contemplated that in accordance with a fourth embodiment of the present invention, a harness pad 330 may be provided which is substantially similar to the above-described harness pad 30. In greater detail, the harness pad 330 differs from the harness pad 30 as result of the integration of elongate energy absorbing material layer (e.g., an energy absorbing foam piece 333) therein. As seen in FIG. 20, when the harness pad 330 is operatively interfaced to a corresponding shoulder strap 14, the foam piece 333 is oriented so as to extend between the gripping second layer 36 of the strap member 32 of the harness pad 330 and the shoulder strap 14. In the harness pad 330, it is contemplated that the foam piece 333 may be integrated into the interior of the first layer 34 of the strap member 32 thereof and/or into the interior of the pad member 50 thereof. In this regard, the criticality lies in the foam piece 333 being disposed between the gripping surface defined by the second layer 36 and the shoulder strap 14. As further shown in FIG. 20, the length of the foam piece may be such that it extends along the majority of the length of, but is slightly shorter then, the second layer 36 or the corresponding harness pad 330. Those or ordinary skill in the art will recognize that the foam piece 333 may also be integrated into the interior of the first layer 34 of the strap member 32 and/or into the interior of the pad member 150 of the harness pad 130, as well as into the harness pad 230 and the harness pad 330.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

What is claimed is:

1. A harness pad for attachment to a juvenile safety seat and interface to a harness system thereof, the harness pad comprising:
    an elongate strap member, at least a portion of which defines an exposed gripping surface including a rubberized grip material positioned thereon, the strap member being engageable to a prescribed portion of the safety seat; and
    a pad member attached to the strap member and engageable to a prescribed portion of the harness system of the safety seat;
    the gripping surface being sized and oriented to span a shoulder of a child seated within the safety seat upon operative interface of the harness system to the child subsequent to engagement of the pad member to the harness system and the strap member to the safety seat, and to allow the shoulder of the child to bear thereagainst in a manner substantially preventing forward excursion of the child.

2. The harness pad of claim 1 wherein:
    the pad member has a quadrangular-shaped configuration defining an opposed, identically configured pair of distal flap portions; and
    the distal flap portions of the pad member are outfitted with corresponding strips of hook and loop fastener material oriented to allow such strips to be releasably engaged to each other in manner maintaining the distal flap portions in a wrapped configuration about the prescribed portion of the harness system of the safety seat.

3. The harness pad of claim 1 further an energy absorbing material layer extending along at least a portion of the gripping surface of the strap member, the energy absorbing material layer being oriented so as to extend between the at least a portion of the gripping surface and the prescribed portion of the harness system subsequent to the attachment of the harness pad to the harness system.

4. The harness pad of claim 1 wherein the strap member and the pad member are each configured for releasable engagement to respective ones of the safety seat and the harness system thereof.

5. The harness pad of claim 4 further comprising an engagement member attached to the strap member and configured to releasably engage the prescribed portion of the juvenile safety seat upon the operative interface of the harness system to the child subsequent to the attachment of the harness pad thereto.

6. The harness pad of claim 4 wherein the strap member defines a loop configured to releasably engage the prescribed portion of the juvenile safety seat upon the operative interface of the harness system to the child subsequent to the attachment of the harness pad thereto.

7. The harness pad of claim 1 wherein the strap member comprises:
    a first layer; and
    a second layer attached to and extending along at least a portion of the first layer, the second layer defining the gripping surface.

8. The harness pad of claim 7 wherein the second layer comprises the rubberized grip material which is of a prescribed tackiness and is secured to one side of the first layer.

9. The harness pad of claim 7 wherein the first and second layers are of disparate lengths.

10. The harness pad of claim 1 wherein the pad member comprises:
    a first pad section; and
    a second pad section separated from the first pad section by an opposed pair of gaps.

11. The harness pad of claim 10 wherein:
    the first pad section has a quadrangular-shaped configuration defining an opposed, identically configured pair of first distal flap portions;
    the first distal flap portions of the first pad section are outfitted with corresponding first strips of hook and loop fastener material oriented to allow such first strips to be releasably engaged to each other in manner maintaining the first distal flap portions in a wrapped configuration about the prescribed portion of the harness system of the safety seat;

the second pad section has a quadrangular-shaped configuration defining an opposed, identically configured pair of second distal flap portions; and the second distal flap portions of the second pad section are outfitted with corresponding second strips of hook and loop fastener material oriented to allow such second strips to be releasably engaged to each other in manner maintaining the second distal flap portions in a wrapped configuration about the prescribed portion of the harness system of the safety seat.

12. A harness pad for attachment to a juvenile booster seat and interface to an existing vehicle restraining system, the harness pad comprising:

an elongate strap member, at least a portion of which defines an exposed gripping surface including a rubberized grip material positioned thereon, the strap member being engageable to a prescribed portion of the booster seat; and a pad member attached to the strap member and engageable to a prescribed portion of the restraining system;

the gripping surface being sized and oriented to span one shoulder of a child seated within the booster seat upon operative interface of the restraining system to the child subsequent to engagement of the pad member to the restraining system and the strap member to the booster seat, and to allow the shoulder of the child to bear thereagainst in a manner substantially preventing forward excursion of the child.

13. The harness pad of claim 12 wherein:

the pad member has a quadrangular-shaped configuration defining an opposed, identically configured pair of distal flap portions; and the distal flap portions of the pad member are outfitted with corresponding strips of hook and loop fastener material oriented to allow such strips to be releasably engaged to each other in manner maintaining the distal flap portions in a wrapped configuration about the prescribed portion of the restraining system.

14. The harness pad of claim 12 further comprising an energy absorbing material layer extending along at least a portion of the gripping surface of the strap member, the energy absorbing material layer being oriented so as to extend between the at least a portion of the gripping surface and the prescribed portion of the vehicle restraining system subsequent to the attachment of the harness pad to the vehicle restraining system.

15. The harness pad of claim 12 wherein the strap member and the pad member are each configured for releasable engagement to respective ones of the booster seat and the restraining system.

16. The harness pad of claim 15 further comprising an engagement member disposed on the strap member and configured to engage the prescribed portion of the booster seat upon the operative interface of the restraining system to the child with the harness pad being engaged to the restraining system.

17. The harness pad of claim 12 wherein the strap member comprises:

a first layer; and a second layer attached to and extending along at least a portion of the first layer, the second layer defining the gripping surface.

18. The harness pad of claim 17 wherein the second layer comprises the rubberized grip material which is of a prescribed tackiness and is secured to one side of the first layer.

19. The harness pad of claim 17 wherein the first and second layers are of disparate lengths.

20. A method of retrofitting a harness system of a juvenile safety seat to increase a weight rating thereof, the method comprising the steps of:

(a) providing a pair of harness pads which each comprise:
an elongate strap member having a pad member attached thereto, at least a portion of which defines the strap member defining an exposed rubberized gripping surface which is sized and oriented to span a shoulder of a child seated within the safety seat upon operative interface of the harness system to the child subsequent to engagement of the pad member to the harness system and the strap member to the safety seat, and to allow the shoulder of the child to bear there against in a manner substantially preventing forward excursion of the child;

(b) advancing a portion of the strap member of each of the harness pads through at least one corresponding slot formed within the safety seat;

(c) releasably engaging the strap member of each of the harness pads to a prescribed portion of the safety seat; and (d) releasably engaging the pad member of each of the harness pads to a prescribed portion of the harness system such that the gripping surfaces of the harness pads will span the shoulders of the child seated within the safety seat upon the operative interface of the harness system to the child subsequent to the retrofit attachment of the harness pads thereto.

\* \* \* \* \*